United States Patent [19]

Bloch et al.

[11] 4,393,625
[45] Jul. 19, 1983

[54] APPARATUS FOR GRINDING GEARS

[75] Inventors: Peter Bloch, Mutschellen; Hansjörg Bickel, Au, both of Switzerland

[73] Assignee: Maag Gear-Wheel & Machine Company Limited, Zurich, Switzerland

[21] Appl. No.: 157,977

[22] Filed: Jun. 9, 1980

[30] Foreign Application Priority Data

Jun. 20, 1979 [CH] Switzerland .................. 5757/79

[51] Int. Cl.³ ................. B24B 49/00; B24B 53/06
[52] U.S. Cl. .................... 51/165.87; 51/95 GH; 51/123 G; 125/11 CD
[58] Field of Search ........ 51/123 G, 165.87, 165.88, 51/95 GH; 125/11 CD

[56] References Cited

U.S. PATENT DOCUMENTS

| | | | |
|---|---|---|---|
| 1,228,798 | 6/1917 | Maag | 51/165.87 |
| 2,545,730 | 3/1951 | Fouquet | 51/165.87 |
| 2,652,661 | 9/1953 | Flander et al. | 125/116 D |
| 2,720,062 | 10/1955 | Fouquet | 51/165.87 |
| 3,597,933 | 8/1971 | Astill | 51/165.87 |
| 3,624,972 | 12/1971 | Graf | 51/123 G |
| 4,143,637 | 3/1979 | Mesey | 125/11 CD |

Primary Examiner—Harold D. Whitehead
Assistant Examiner—K. Bradford Adolphson
Attorney, Agent, or Firm—Werner W. Kleeman

[57] ABSTRACT

An apparatus for grinding gears having an involute-shaped tooth flank profile, wherein there are accomplished between a dished or plate-shaped grinding wheel and the gear teeth to-and-fro generating movements as well as feed or advance movements in the tooth lengthwise direction, adjustment movements for compensating for the wear of the grinding wheel, and, finally, indexing movements. The grinding wheel is advanced between two respective indexing movements, independently of the magnitude of the adjustment needed for compensating for wear of the grinding wheel, by such an amount towards the tooth root that also such tooth root is ground.

2 Claims, 7 Drawing Figures

APPARATUS FOR GRINDING GEARS

CROSS-REFERENCE TO RELATED APPLICATION

This application is related to the commonly assigned U. S. application Ser. No. 6/127,368, filed Mar. 4, 1980 of Hansjörg Bickel, entitled "Dressing Apparatus for a Dished Grinding Wheel at a Tooth Flank-Grinding Machine".

BACKGROUND OF THE INVENTION

The present invention relates to a new and improved apparatus for grinding gear teeth having an involute-shaped tooth flank profile, wherein to-and-fro generating movements are carried-out between a dished or plate-shaped grinding wheel and the gear teeth as well as feed or advance movements in the tooth lengthwise direction, adjustment or readjustment movements for compensation of the wear of the grinding wheel, and finally, indexing movements.

In the case of highly loaded gear teeth, as such for instance are employed in the aircraft industry, it is not only necessary to grind the involute-shaped tooth flanks, but also the tooth root or bottom land, so that there can be maintained prescribed tooth root clearances or fillets and to obtain a fine surface of the tooth base or bottom land. Both of these factors are extremely important in consideration of the permanent bending strength of the gear teeth.

With heretofore known methods of the previously described species and the state-of-the-art grinding machines provided for the performance of such method, such as for instance disclosed in German patent publication No. 2,726,843, and the corresponding U.S. Pat. No. 4,213,277, granted July 22, 1980, wherein such grinding machine is equipped with grinding wheel-dressing and readjustment devices, it is possible to grind in short machining times teeth flanks having great accuracy. However, it was not heretofore possible to machine the tooth root or bottom land, so that whenever there were demanded high requirements at the tooth root fillets and surface quality of the tooth bottom land, it was heretofore necessary to chuck or clamp the workpiece, prior to or following its machining at a tooth flank-grinding machine, upon a separate machine serving for machining the tooth root or bottom land.

There are indeed known to the art methods and apparatus for the form grinding of tooth flanks, wherein the profile or shape of the grinding wheel, continuously maintained by a dressing device, for instance as taught in German Pat. No. 2,536,895, and the corresponding U.S. Pat. No. 4,128,093, granted Dec. 5, 1978, is structured such that, apart from producing the involute-shape of the teeth flanks there are also realized the desired shape and surface quality of the bottom land or tooth root. During form or shape grinding it is however disadvantageous that the accuracy of the shape of the tooth flanks is dependent upon the accuracy of the profile or shape of the grinding wheel, so that when greater requirements are placed upon the quality of the gear teeth it is necessary to quite frequently reshape the grinding wheel. Hence, there is needed a complicated dressing device which is controlled by templets or a generating drive. Furthermore, there exists the well known difficulty that during form grinding of helical gearing, it is necessary to alter the profile of the grinding wheel with decreasing grinding wheel diameter. Moreover, in the case of form grinding, in contrast to indexing generating grinding, it is not possible to undertake random profile corrections at the teeth flanks. Finally, the machining times are extremely long during form grinding.

SUMMARY OF THE INVENTION

Therefore, with the foregoing in mind it is a primary object of the present invention to provide a new and improved index generating apparatus for grinding gears, in a manner not afflicted with the aforementioned drawbacks and limitations of the prior art proposals.

Another and more specific object of the present invention aims at providing an index generating apparatus, wherein during the same chucking or clamping of the workpiece upon a grinding machine it is possible, with the aid of a dished grinding wheel or preferably a pair of such grinding wheels, to not only grind the involute-shaped tooth flanks, but also the tooth root or bottom land.

Now in order to implement these and still further objects of the invention, which will become more readily apparent as the description proceeds, the method aspects of the present development are manifested by the features that the grinding wheel is advanced or fed towards the tooth root or bottom land between each two respective indexing movements, independently of the magnitude of the readjustment needed for compensating for wear of the grinding wheel, by such an amount towards the tooth root that also such tooth root or bottom land can be ground.

Thus, there is still carried out the readjustment—also sometimes briefly simply referred to as adjustment—required for compensating for wear of the grinding wheel, which readjustment, as is well known from the prior art in this technology, is accomplished at regular or irregular time intervals, and specifically, usually both in the axial direction as well as in the radial direction of the grinding wheel, so that by virtue of such readjustment and the therewith associated dressing operation the active grinding point of the grinding wheel always maintains its position at the tooth flank, predetermined for a given generating position, and is always brought back again into such position by virtue of the readjustment operation. Now in addition to this readjustment operation, needed because of the wear and dressing of the grinding wheel, there is accomplished, as contemplated by the invention, at the same time or with a time shift in relation to the readjustment, a feed or advance of the grinding wheel by virtue of which there is shifted the active grinding point. This shifting renders possible grinding of the tooth bottom land and, specifically, with the same dished grinding wheel which previously was used for grinding a tooth flank and/or thereafter is employed for grinding a tooth flank. In this regard there are available two different possibilities of grinding the tooth root or bottom land:

According to a first embodiment of the inventive method the grinding wheel or each grinding wheel of a pair of grinding wheels only immerses into the bottom land or tooth root at the end of each generating stroke which is directed towards the tooth root. Thus, the tooth root grinding is carried out in alternation with the generating grinding of a tooth flank. The grinding wheel basically can be advanced at random points in time during the generating motion. Since, however, the generating geometry alters by virtue of the inventive advance or feed operation, even if only as a general rule slightly, the variant embodiment of the invention relying upon so-called immersion grinding of the tooth root or bottom land generally is only employed for roughing.

If the immersion grinding of the tooth root should also be employed during finish grinding by advancing the grinding wheel, then the grinding wheel advantageously is first then advanced at the end or shortly prior to the end of each generating stroke which is directed towards the tooth root and is again retracted prior to or at the start of the next opposite generating stroke. Consequently, there can be maintained without change the generating geometry during grinding of the flanks of the gear teeth.

Due to the immersion grinding of the tooth root which is combined stroke-for-stroke with the generating grinding of the tooth flanks, there are formed at the tooth root or bottom land depressions or troughs, the radius of curvature of which corresponds to the radius of the grinding wheel. As a general rule such troughs can be accepted, since they are practically without any influence upon the fatigue strength under reversed bending stresses of the bottom land of the gear teeth. If, however, there is required a tooth bottom land which is free of troughs or undulations, then such can be obtained by resorting to a different variant of the inventive method. According to the modified method of the invention, the dished grinding wheel, during such time as there is not accomplished any generating movement, is moved in the lengthwise direction of the tooth along the tooth bottom land. This variant teaching of the method of the invention requires a greater amount of time for the grinding work: yet this increased expenditure in time can be, however, readily justified particularly when there are to be fabricated precision gears, particularly since, in comparison to grinding of the bottom lands of gear teeth at a separate machine, with the inventive technique there is realized an appreciable saving in both time and costs.

Now in order to realize an apparatus suitable for the performance of the inventive method, there is started with equipment of the type disclosed in the aforementioned commonly assigned U. S. application Ser. No. 6/127,368, filed Mar. 4, 1980 of the inventor Hansjörg Bickel, a coinventor of the inventions disclosed herein. Such equipment contains at least one grinding head at which there is mounted a substantially dished grinding wheel, and a grinding head support or carrier at which there can be adjustably guided the grinding head in the radial direction of the grinding wheel. There is also provided a dressing device which can be displaced in the adjustment direction and an adjustment or readjustment drive which, by means of readjustment gearing, is capable of imparting to the grinding head and the dressing device adjustment or readjustment movements in a ratio of 1:2. At such type equipment there is provided for the readjustment gearing, according to the invention, additionally an advance or feed drive which is capable of imparting to the grinding head together with the dressing device common and equal size advance or feed movements.

Also when designing an apparatus for performing the inventive method, it is equally possible to rely upon the features that the dressing device is displaceably guided at the grinding head in the adjustment direction, and at the grinding head there is mounted a pinion which meshes with two gear racks which extend in the adjustment direction. One of these gear racks is arranged at the grinding head support and the other gear rack at the dressing device. These features can be expanded upon, according to the teachings of the present development, in that one of both gear racks can be displaced in its lengthwise direction by the advancing or feed drive such that the pinion, in the presence of a movement of the grinding head caused by the adjustment drive, is prevented from carrying out any rotation, and thus, the dressing device participates in the movement of the grinding head in a ratio of 1:1.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 4a and 4b illustrate the known indexing generating-grinding method which can be accomplished at the gear grinding machine of FIG. 1, wherein FIG. 4a is a fragmentary perspective view and FIG. 4b is a sectional view of parts of a gear and a dished grinding wheel machining a tooth flank.

DETAILED DESCRIPTION OF THE PREFERRED EMBODIMENTS

Figure 1:
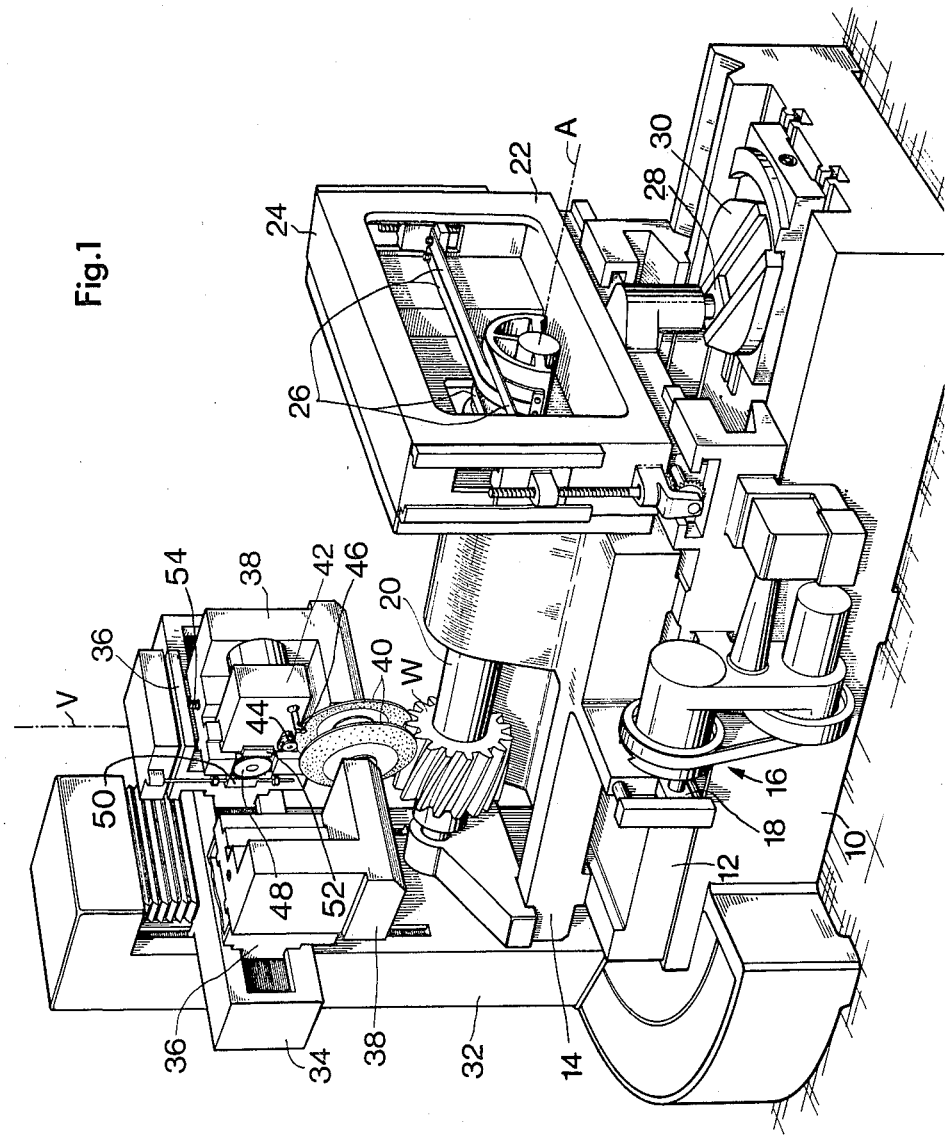
FIG. 1 is a perspective view of a gear grinding machine containing a somewhat simplified illustration of apparatus for performance of the method of the invention.

Describing now the drawings, the gear grinding machine illustrated by way of example in FIG. 1, will be seen to comprise a machine bed 10, upon which there is displaceably guided a longitudinal carriage or slide 12 for lengthwise movement, i.e. parallel to the axis A of the workpiece W which is to be ground. A standard and therefore not particularly illustrated drive is used, as is well known in this technology, for accomplishing to-and-fro displacements of the longitudinal carriage or slide 12.

Guided upon the longitudinal carriage 12 is a generating carriage or slide 14 for movements transversely with respect to the axis A. Laterally mounted at the longitudinal slide 12 is a crank drive 16 which, with the aid of an eccentrically adjustable crank or sliding block 18, places the generating slide 14 into to-and-fro transverse movements. Mounted upon the generating slide 14 is a chucking or clamping mandrel 20 which is rotatable about the axis A, this chucking mandrel 20 supporting the workpiece W and being connected, by means of a conventional and therefore not particularly illustrated indexing head, with a rolling block arrangement 22.

Upon the longitudinal slide 12 there is displaceably guided, likewise for movement transversely with respect to the lengthwise axis A of the workpiece W which is to be ground, a rolling tape support or stand 24 which is connected by the rolling tapes 26 with the rolling block arrangement 22. If the generating slide or carriage 14 is moved to-and-fro upon the longitudinal slide 12, while the rolling tape stand 24 remains stationary in relation to the longitudinal slide 12, then the workpiece W performs a generating movement. This generating movement is composed of the transverse movement of the generating slide 14 and a superimposed rotation of the workpiece W about its own axis A.

At the rolling tape stand 24 there is mounted a sliding block 28 which is guided in a coulisse or guide arrangement 30 which is adjustably attached at the machine bed 10. When the work-piece W, as best seen by referring to FIG. 1, possesses helical gear teeth, then the guide arrangement 30 is adjusted at an angle in relation to the axis A and which angle coincides with the helix tooth angle. Movements of the longitudinal slide 12 to-and-fro along the axis A then result in the rolling tape support 24 carrying out to-and-fro transverse movements upon the longitudinal slide 12, and consequently, imparting to the workpiece 10, by means of the rolling back arrangement 22, additional to-and-fro indexing rotations which are superimposed upon the indexing rotations caused by the to-and-fro transverse movements of the generating slide 14.

Furthermore, there is arranged upon the machine bed 10 a stand or upright 32 so as to be pivotably or swivelably adjustable about a vertical axis V. At the machine stand 32 there is guided so as to be elevationally adjustable a substantially horizontally extending transverse beam or support 34. The transverse beam 34 carries two grinding head supports 36 which are symmetrically constructed in relation to one another, these grinding head supports 36 being adjustable in opposite sense along the transverse beam 34. At each grinding head support 36 there is guided so as to be elevationally adjustably a grinding head 38. At each grinding head 38 there is mounted a dished grinding wheel 40.

Now in FIG. 1 there only has been completely illustrated the grinding head support 36, arranged further rearwardly with respect to the observer of such FIG. 1, along with the related grinding head 38, whereas for the purpose of enhancing the illustration there have been omitted portions of the front grinding head support 36 and the grinding head 38.

At each of both grinding heads 38 there is guided to be vertically displaceable a dressing device 42 containing a dressing tool 44, here shown in the form of a dressing roll, and a feeler 46. Furthermore, there is mounted at each grinding head 38 a pinion 48 which, on the one hand, meshes with a gear rack 50 arranged vertically at the related grinding head support or carrier and, on the other hand, with a gear rack 52 secured vertically at the related dressing device 42. For performing elevational adjustments or displacements there is operatively associated with each grinding head 38 a vertical or upright threaded spindle 54.

Figure 2:
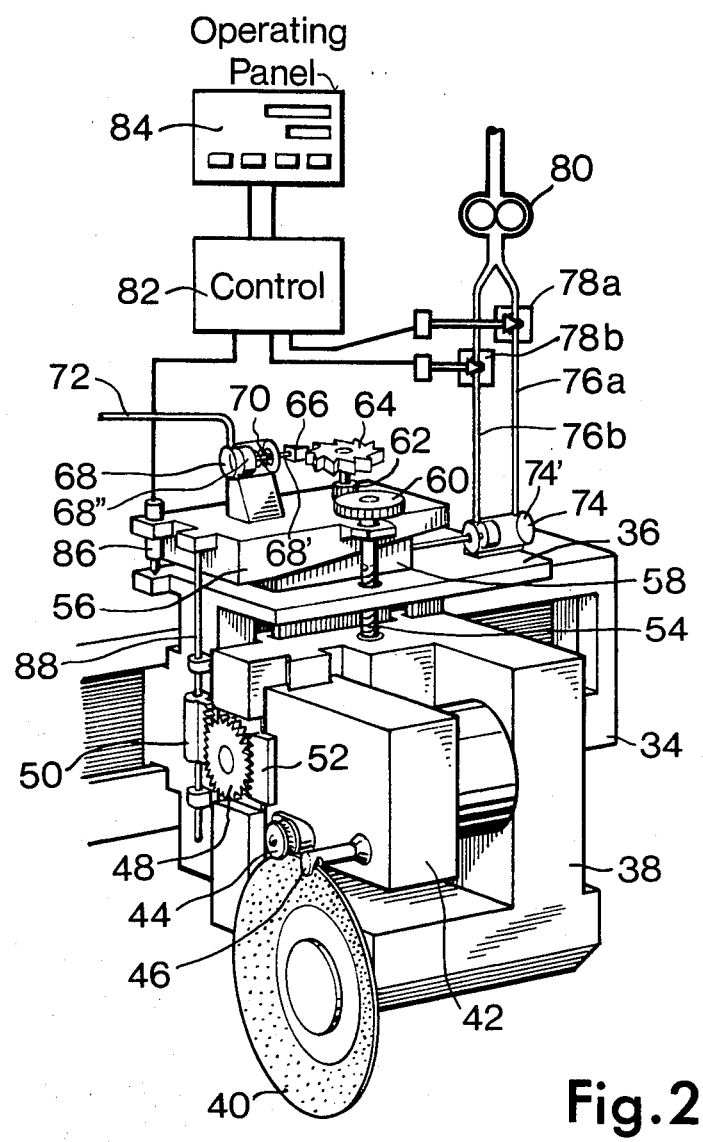
FIG. 2 is a corresponding perspective view of the aforementioned apparatus showing further details thereof.
Figure 3:
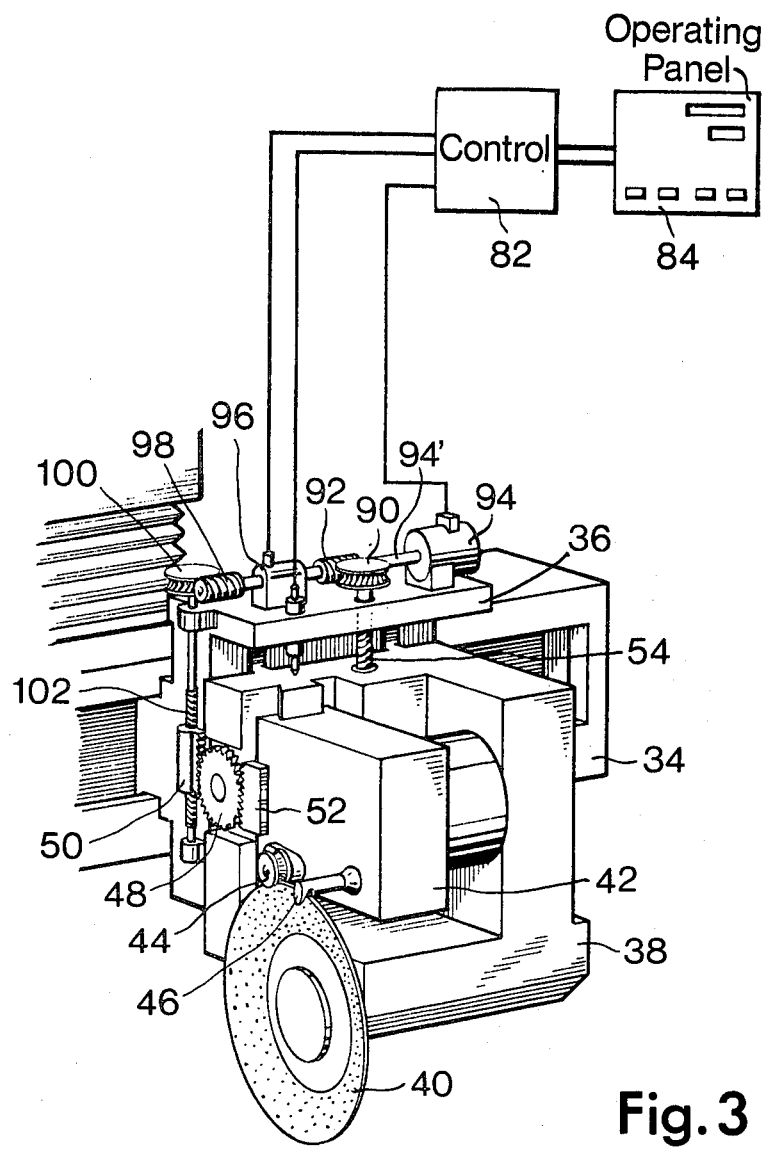
FIG. 3 is a perspective view of a different embodiment of apparatus for performing the inventive method and which can be used with the gear grinding machine shown in the arrangement of FIG. 1.

Details of the grinding head supports 36 and the grinding heads 38 will now be described in accordance with two different embodiments as illustrated in FIGS. 2 and 3.

According to the showing of FIG. 2 the threaded spindle 54 is mounted in a horizontal wedge plate 56 which is guided so as to be elevationally adjustable at the grinding head support 36; the mounting is carried out such that the threaded spindle 54 participates in each elevational adjustment of the wedge plate 56. This wedge plate 56 bears upon a wedge 58 or equivalent structure, guided so as to be horizontally displaceable at the grinding head support 36, so that upon displacement of the wedge 58 the wedge plate 56 is shifted upwardly or downwardly parallel to itself.

At the upper end of the threaded spindle 54 there is secured a gear 60 which meshes with a pinion 62. The pinion 62 is mounted at the wedge plate 56 and is rigidly connected with a ratchet wheel 64 which coacts with a pawl 66. The pawl 66 is arranged at the piston rod 68' of a hydraulic or pneumatic piston-and-cylinder unit 68 whose piston 68" is prebiased by a return or restoring spring 70 or equivalent structure in a direction away from the ratchet wheel 64. The not particularly referenced cylinder space at the side of the piston 68" of the piston-and-cylinder unit 68, and which piston side or face faces away from the ratchet wheel 64, is connected by means of a line or conduit 72 and a not particularly illustrated but conventional valve with a source of pressurized fluid medium. Each pressurized fluid medium pulse, infed to the piston-and-cylinder unit 68, causes a rotation of the ratchet wheel 64 through one tooth division, and thus, a defined partial or indexing rotation of the threaded spindle 54.

In order to displace the wedge 58 there is provided a double-acting piston-and-cylinder unit 74, both of whose cylinder chambers are connected by a respective line or conduit 76a and 76b and by means of a respective solenoid valve 78a and 78b with a pressurized fluid medium pump 80. The solenoid valves 78a and 78b are electrically connected with a suitable control device 82, such as for instance a three-point position control, and an operating panel or console 84, for instance a crossbar board. The cylinder 74' of the piston-and-cylinder unit 74 is of sufficient length in order to render possible an adjustment of the wedge or wedge element 58 through a shorter or longer path, as desired, as well as throughout a number of discrete increments.

Arranged at the wedge plate 56 is a displacement path transmitter 86 which coacts with the grinding head support 36 and likewise is connected with the control device or control means 82. During each elevational adjustment of the wedge plate 56, in relation to the grinding head support 36, the displacement path transmitter 86 delivers appropriate signals to the control device 82.

Finally, there is attached to the wedge plate 56 a vertical or upright rod 88 which is displaceably guided in vertical direction at the grinding head support 36. Secured to the rod 88 is the gear rack 50.

A displacement of the wedge 58 to the right of the showing of FIG. 2, brought about by the piston-and-cylinder unit 74, brings about downward movement of the wedge plate 56 in accordance with the wedge angle, and participating in such movement are the threaded spindle 54 and the rod 88. Consequently, the grinding head 38 and the gear rack 50 move simultaneously and through the same distance in the downward direction as the wedge plate 56. Since as a consequence thereof—with the threaded spindle 54 not rotating—there does not occur any relative movement between the gear rack 50 and the pinion 48, the pinion 48 downwardly entrains the gear rack 52, and thus the entire dressing device 42 through the same distance through which the grinding head 38 has moved downwardly. This downward movement constitutes a pure advance or feed movement, which is not associated with a dressing of the grinding wheel or disk 40, and therefore, shifts the active grinding point downwardly towards the tooth root or bottom land.

On the other hand, if it is necessary to dress the grinding wheel 40, then by means of the piston-and-cylinder unit 68 there is initiated a rotation of the threaded spindle 54, and thus, a downward movement of the grinding head 38, with which there does not participate the wedge plate 56, and therefore, also the gear rack 50. Hence, the downward movement of the grinding head 38 is correlated to a rotation of the pinion 62, so that such downwardly shifts the dressing device 42 in relation to the grinding head 38. Hence, during each vertical movement of the grinding head 38, which is only triggered by the piston-and-cylinder unit 68 and not correlated to a displacement of the wedge 58, the dressing device 42 therefore shifts through twice the path.

With the embodiment of FIG. 3 the threaded spindle 54 is directly mounted at the grinding head support 36 in such a manner that it only is conjointly elevationally displaceable therewith. At the upper end of the threaded spindle 54 there is attached a worm gear 90 which meshes with a worm 92. The worm 92 is attached to the shaft 94' of a stepping or indexing motor 94 and can be coupled by means of a switching clutch or coupling 96 with a further worm 98. This further worm 98 meshes with a worm gear 100 which is attached to a threaded spindle 102 which is mounted to be axially non-displaceable at the grinding head support 36. The threaded spindle 102 is threaded into a not particularly visible nut threading formed at the gear rack 50, so that each rotation of the threaded spindle 102 causes an elevational displacement of this gear rack 50. The apparatus of FIG. 3 functions in analogous fashion to that disclosed in connection with FIG. 2.

For example, in FIG. 2, the adjustment drive includes elements 48, 50, 52, 54, 60, 62, 64, 66, 68, and 70. Among these elements of the adjustment drive, there is included the adjustment gearing 60 and 62. The advance drive includes elements 56, 58, and 74 and are operatively associated with the adjustment gearing 60 and 62.

In an analogous manner, in FIG. 3, the adjustment drive includes elements 54, 90, 92, and 94. Among these elements of the adjustment drive, there is the adjustment gearing 90 and 92. The advance drive includes elements 96, 98, and 100 and is likewise operatively associated with the adjustment gearing 90 and 92.

In the embodiments of both figures, the advance drive shifts an active grinding point of the dished grinding wheel 40 downwardly toward the tooth root of the gear tooth being ground so as to selectively grind a different part of the gear tooth by means of a peripheral portion of the dished grinding wheel 40. Preferably, the different part of the gear tooth which is ground constitutes the tooth root region.

Figure 4A:
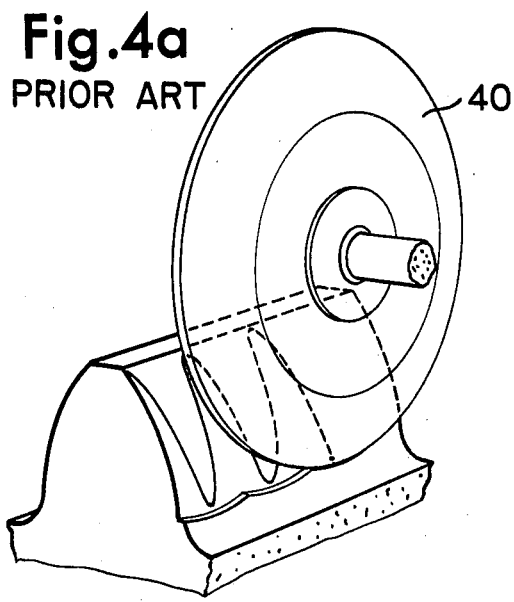
Figure 4B:
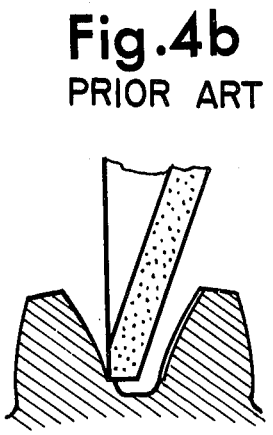

FIGS. 4a and 4b illustrate the prior art where the grinding wheel only grinds the tooth flank and not the bottom land or tooth root. This type of grinding procedure is described in U.S. Pat. No. 4,213,277.

Figure 5A:
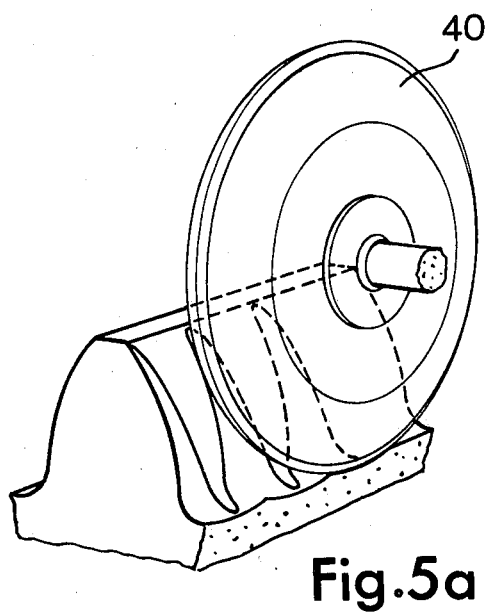
FIGS. 5a and 5b illustrate an exemplary embodiment of the inventive method which can be accomplished at the gear grinding machine of FIG. 1 utilizing the apparatuses of FIG. 2 or FIG. 3, wherein again these Figures are analogous to FIGS. 4a and 4b are specifically show a fragmentary perspective and a sectional view, respectively, of parts of the gear and coacting grinding wheel during machining of the tooth root or bottom land.
Figure 5B:
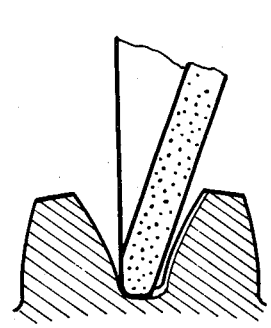

On the other hand, FIGS. 5a and 5b show the method of accomplishing the present invention with the apparatus described hereinabove, i.e., grinding the tooth root or bottom land. The entire specification hereinabove has been directed to explaining the inventive differences between the prior art shown in FIG. 4a and FIG. 4b and the present invention shown in FIG. 5a and FIG. 5b.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus for grinding gear teeth having substantially involute-shaped tooth flank profiles and tooth roots, comprising:
   at least one grinding head;
   a substantially dished grinding wheel having an active grinding point and being mounted at said grinding head;
   a grinding head support at which there is adjustably mounted the grinding head in the radial direction of the dished grinding wheel;
   a dressing device displaceable in a predetermined adjustment direction;
   means for displaceably grinding the dressing device at the grinding head in the adjustment direction;
   adjustment device means;
   said adjustment drive means including adjustment gearing, a pinion mounted at said grinding head, two gear racks extending in the adjustment direction and with which meshes said pinion, one of said gear racks being arranged at said grinding head support, the other of said gear racks being arranged at said dressing device;
   said adjustment drive means imparting by means of the adjustment gearing to the grinding head and the dressing device adjustment movements in a ratio of approximately 1:2;
   an advance drive means for displacing both gear racks in its lengthwise direction such that the pinion is prevented from rotating during a movement of the grinding head which is caused by the adjustment drive means, in order to thereby enable the dressing device to participate in the movement of the grinding head in a ratio of approximately 1:1;
   said advance drive means shifts the active grinding point of the dished grinding wheel downwardly towards the tooth root of the gear tooth being ground so as to selectively grind a different part of the gear tooth by means of a peripheral portion of the dished grinding wheel;
   said advance drive means shifts the active grinding point of the dished grinding wheel downwwardly towards the tooth root of the gear tooth being ground in order to grind said different part of the gear tooth along a grinding curve which differs from the involute along which there is ground the tooth flank profiles of the gear teeth.

2. The apparatus as defined in claim 1, wherein:
   said advance drive means shifts the active grinding point of the dished grinding wheel downwardly so that said different part of the gear tooth which is ground constitutes the tooth root region.

* * * * *